United States Patent
Young

(10) Patent No.: US 6,364,776 B1
(45) Date of Patent: Apr. 2, 2002

(54) DAMPING DEVICE

(75) Inventor: Alastair John Young, Kenilworth (GB)

(73) Assignee: AP TMF Limited, Leamington Spa (GB)

( * ) Notice: Subject to any disclaimer, the term of this patent is extended or adjusted under 35 U.S.C. 154(b) by 0 days.

(21) Appl. No.: 09/403,070

(22) PCT Filed: Feb. 5, 1999

(86) PCT No.: PCT/GB99/00379

§ 371 Date: Oct. 13, 1999

§ 102(e) Date: Oct. 13, 1999

(87) PCT Pub. No.: WO99/41522

PCT Pub. Date: Aug. 19, 1999

(30) Foreign Application Priority Data

Feb. 13, 1998 (GB) .............................................. 9803048

(51) Int. Cl.$^7$ ................................................. F16D 3/12
(52) U.S. Cl. ........................... 464/68; 192/201; 464/62; 464/66
(58) Field of Search .............................. 464/62, 63, 66, 464/69, 68; 74/574; 192/201, 207, 214, 214.1

(56) References Cited

U.S. PATENT DOCUMENTS

| | | | | | |
|---|---|---|---|---|---|
| 3,296,887 | A | * | 1/1967 | Larsen ......................... | 74/574 |
| 5,201,394 | A | * | 4/1993 | Suzuki ......................... | 464/68 |
| 5,557,984 | A | * | 9/1996 | Cooke et al. .................. | 74/574 |
| 5,697,845 | A | * | 12/1997 | Curtis ......................... | 464/68 |
| 5,848,938 | A | * | 12/1998 | Curtis et al. .................. | 464/66 |

* cited by examiner

Primary Examiner—Lynne H. Browne
Assistant Examiner—Aaron Dunwoody
(74) Attorney, Agent, or Firm—Paul E Milliken; Ray L Weber

(57) ABSTRACT

A damping device (10) includes co-axially arranged first and second parts (11, 12) which can rotate relative to each other by a limited amount about an axis (15) of the damping device. The device also includes at least one linkage device (40A) comprising an anchor link (43) pivotally connected via a first pivot (44) to the first part (11) and having a torque transmitting connection (41A) with the second part (12). The linkage device (40A) acting to resist relative rotation of the first and second pars (11, 12). There is also provided a resilient means in the form of coil spring (66A) which acts generally circumferentially between the linkage device (40A) and the first part (11) to resist relative rotation of the first and second parts (11, 12).

50 Claims, 8 Drawing Sheets

DAMPING DEVICE

FIELD OF THE INVENTION

The present invention relates to damping devices for transmitting torque between an input part and an output part which can rotate relative to each other and also for absorbing or compensating for torque fluctuations. Typically such damping devices can be used in vehicle transmissions for example as part of a twin mass fly wheel or in a torque converter or used on their own in a vehicle drive line.

It is an object of the present invention to provide an improved form of damping device which causes a resistance to relative rotation of input and output parts which varies dependant upon the angular position of the input part relative to the output part.

SUMMARY OF THE INVENTION

Thus, according to the present invention there is provided a damping device including co-axially arranged first and second parts which can rotate relative to each other by a limited amount about an axis of the damping device, the damping device also including at least one linkage device comprising an anchor link pivotally connected via a first pivot to the first part and having a torque transmitting connection with the second part, the linkage device acting to resist relative rotation of the first and second parts and a resilient means acting generally circumferentially between the linkage device and the first part to resist relative rotation of the first and second parts.

According to a further aspect of the invention there is also provided a damping device including co-axially arranged first and second parts which can rotate relative to each other by a limited amount about an axis of the damping device, the damping device also including at least one linkage device comprising an anchor link pivotally connected via a first pivot to the first part, and having a torque transmitting connection with the second part, the linkage device acting to resist relative rotation of the first and second parts, and the first pivot being resiliently mounted on the first part.

According to a still further aspect of the invention there is provided a damping device comprising co-axially arranged first and second parts which can rotate relative to each other by a limited amount about an axis of the damping device, and having damping means acting to resist relative rotation of the first and second parts, stops being provided on the first and second parts respectively which come into contact to substantially limit the relative rotation of the two parts, in which at least one of the stops is resiliently mounted to its respective part so as to permit a further limited amount of relative rotation of the two parts following contact between the stops.

BACKGROUND OF THE INVENTION

The generally circumferentially acting resilient means of the above first statement of invention, the resilient mounting of the first pivot on the first part of the above second statement of invention and the resilient mounting of one of the stops of the above third statement of invention are all independently applicable to the embodiments shown in prior patent applications PCT/GB96/01282, PCT/GB97/00361, GB 9709436.1 and GB-A-2313898.

BRIEF DESCRIPTION OF SEVERAL VIEWS OF THE DRAWINGS

The invention shall now be described by way of example only with reference to the accompanying drawings in which.

DETAILED DESCRIPTION OF THE INVENTION

Figure 1:
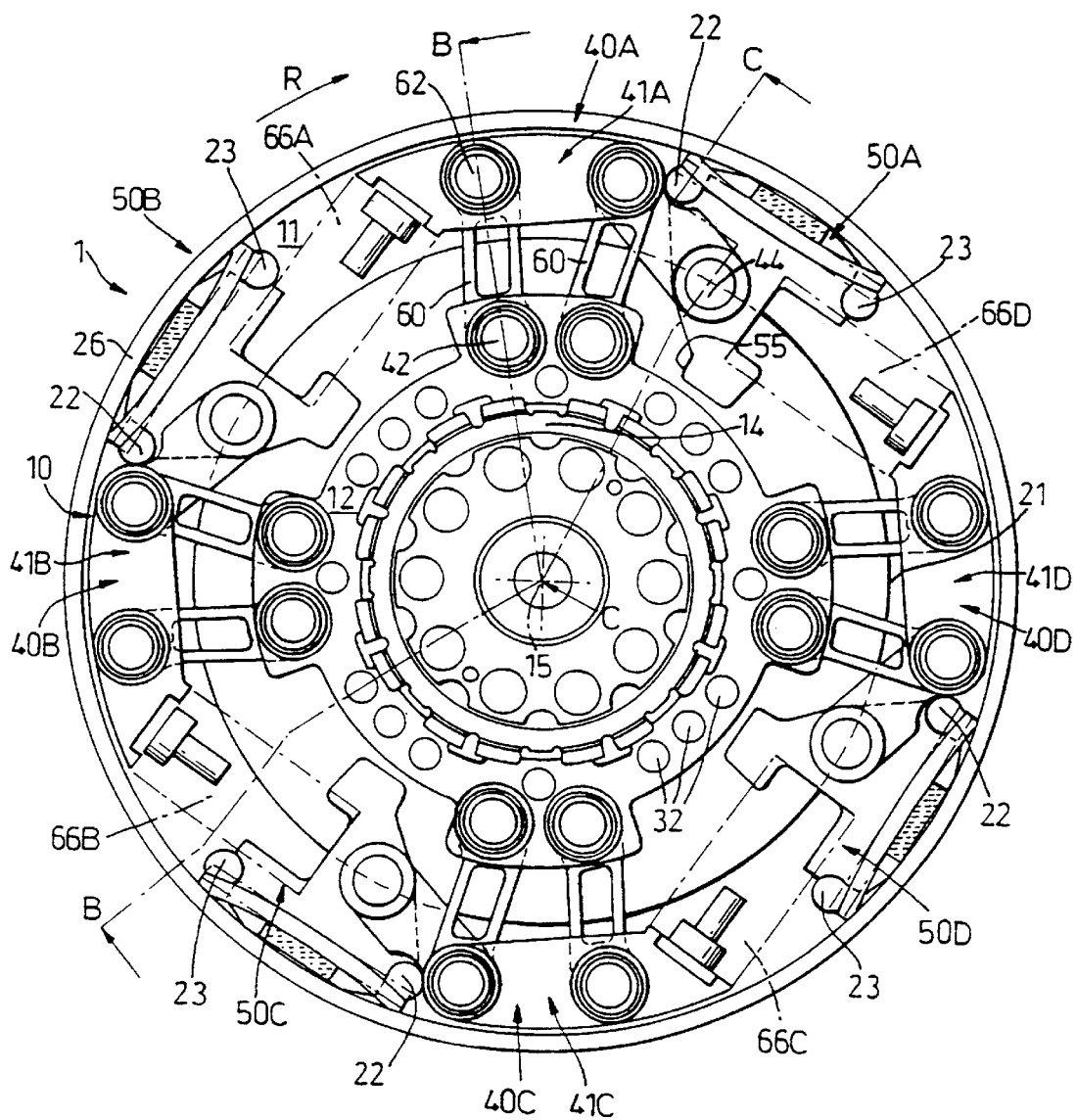
FIG. 1 is an axial cutaway view taken in the direction of arrow A of FIG. 2 of a damping device according to the present invention incorporated into a twin mass flywheel.

With reference to FIGS. 1–5 there is illustrated a twin mass flywheel 1 incorporating a damping device 10. The damping device includes first part 11 and second part 12 which can rotate relative to each other via by a bearing arrangement 13. In this case the bearing arrangement consists of two rotating element ball bearings 13A, 13B axially spaced relative to each other.

First part 11 consists of input plate 20, rim 26 and cover plate 21. Pins 22 and 23 are secured between input plate 20 and cover plate 21. First part 11 further includes a plurality of abutment members (also known as support members) 50A, 50B, 50C, 50D.

Figure 1A:
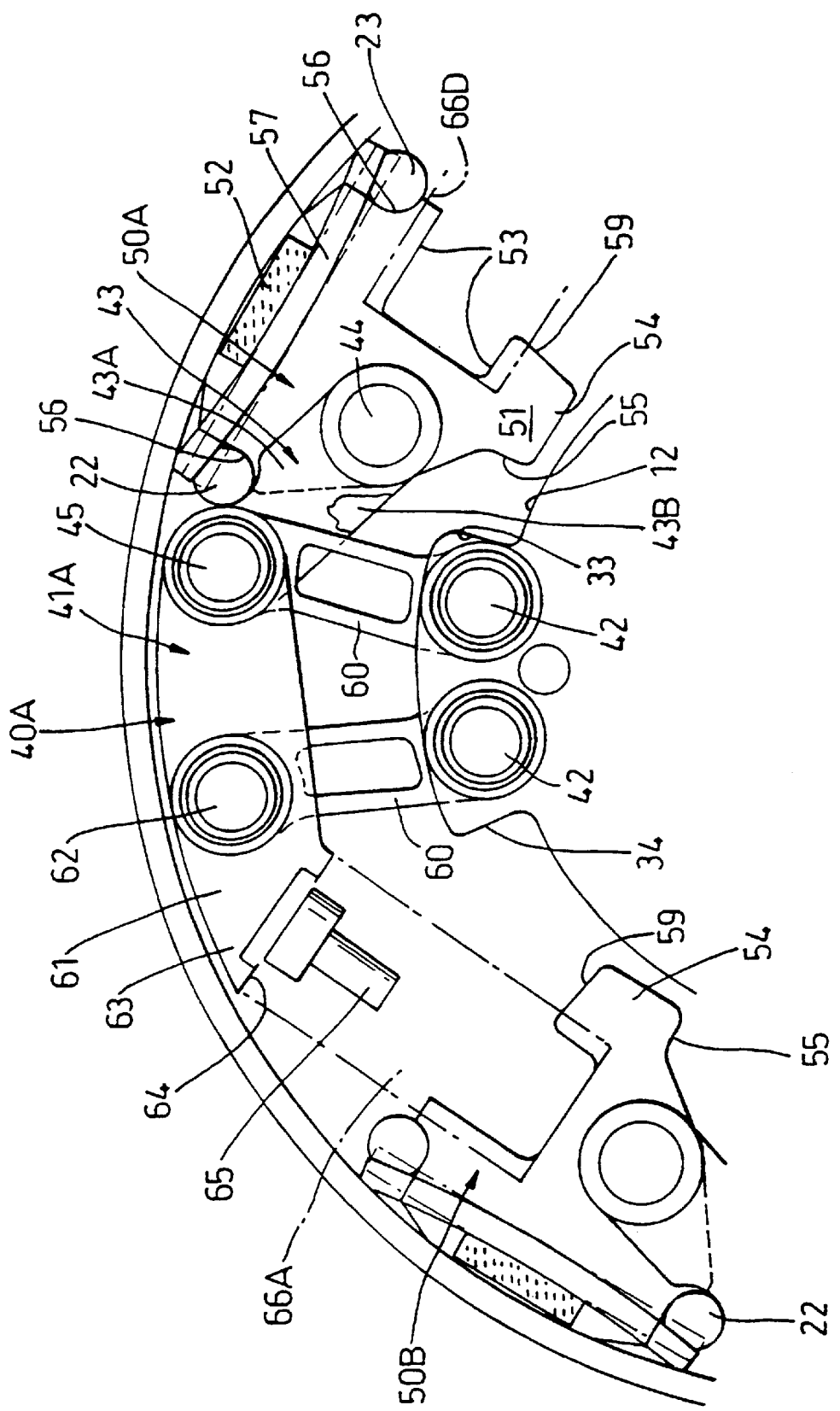
FIG. 1A is a partial view of FIG. 1.
Figure 8:
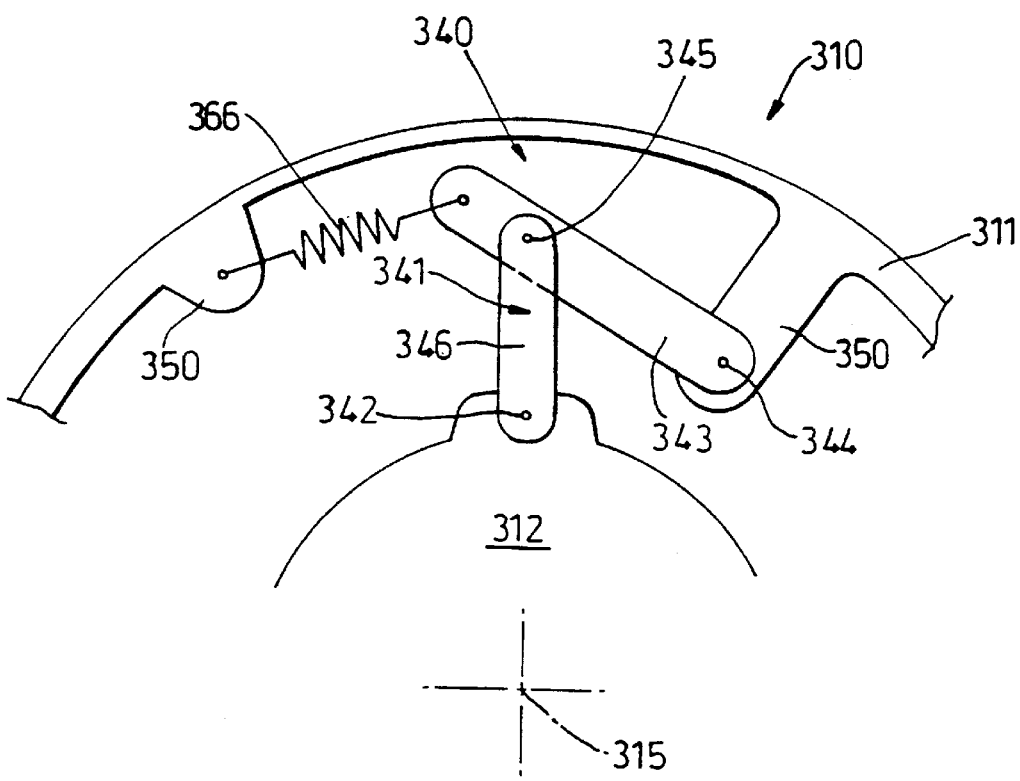
FIG. 8 is an axial view of a fourth embodiment of a damping device according to the present invention.

Second part 12 consists of output plate 30 and pivot plate 31 secured rotationally fast to the output plate 30 by rivets 32. The damping device 10 further consists of a plurality of linkage devices 40A, 40B, 40C, 40D. All the linkage devices are identical and all abutment members are identical. For the purposes of description it is convenient to consider one linkage device 40A and its associated abutment members 50A and 50B in isolation (see FIG. 1A).

Linkage device 40A acts as a torque transmitting connection between the first and second parts and comprises an anchor link 43 pivotally connected by a first pivot 44 to first part 11 via abutment member 50A. Anchor link 43 is in the form of a pair of links 43A, 43B mounted axially one on either side of abutment member 50A. Anchor link 43 is also pivotally connected via a second pivot 45 to a linkage arrangement 41A.

Linkage arrangement 41A acts as a torque transmitting connection between the anchor link and the second part and comprises a plurality of circumferentially spaced main links 60 (in this case two main links). Main links 60 are each pivotally connected to second part 12 via a third pivot 42. Main links 60 are interconnected by a generally circumferentially orientated connecting linkage 61 pivotally mounted at one end via second pivot 45 to one of the main links 60 and the anchor link 43, and pivotally connected at another portion to the other of the main links 60 via a further pivot 62. End 63 of connecting linkage 61 includes a spring abutment portion 64 and a spring guide rod 65.

Figure 3:
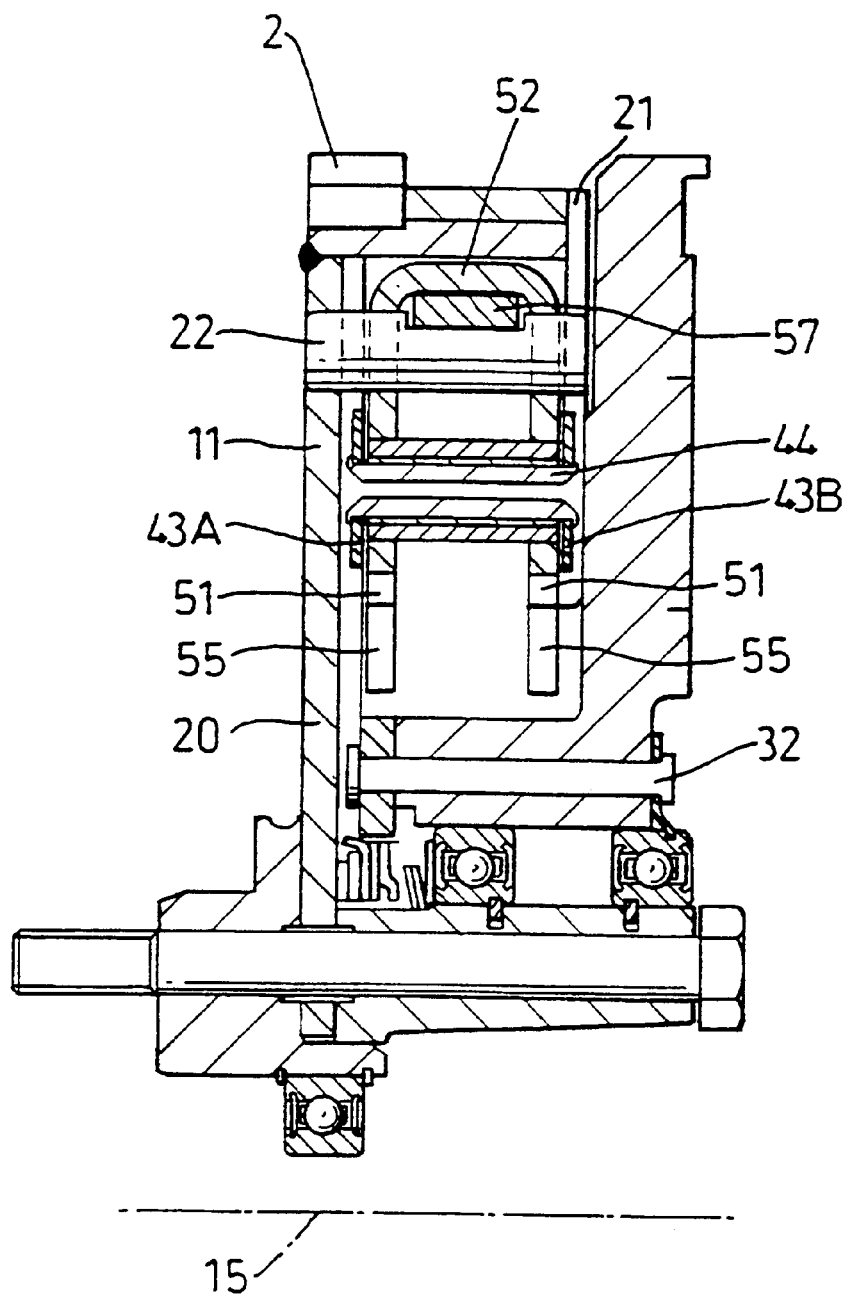
FIG. 3 is a radial view taken along the line CC of FIG. 1.
Figure 4:
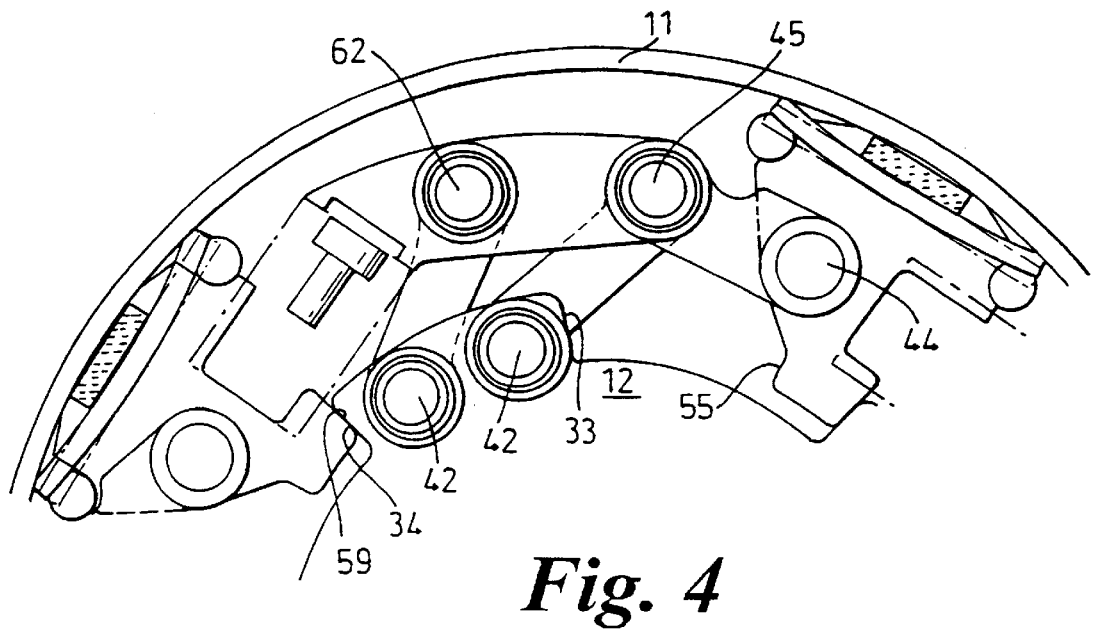
FIG. 4 is a partial axial cutaway view taken in the direction of arrow A of FIG. 2 showing the damping device in a full drive condition.
Figure 5:
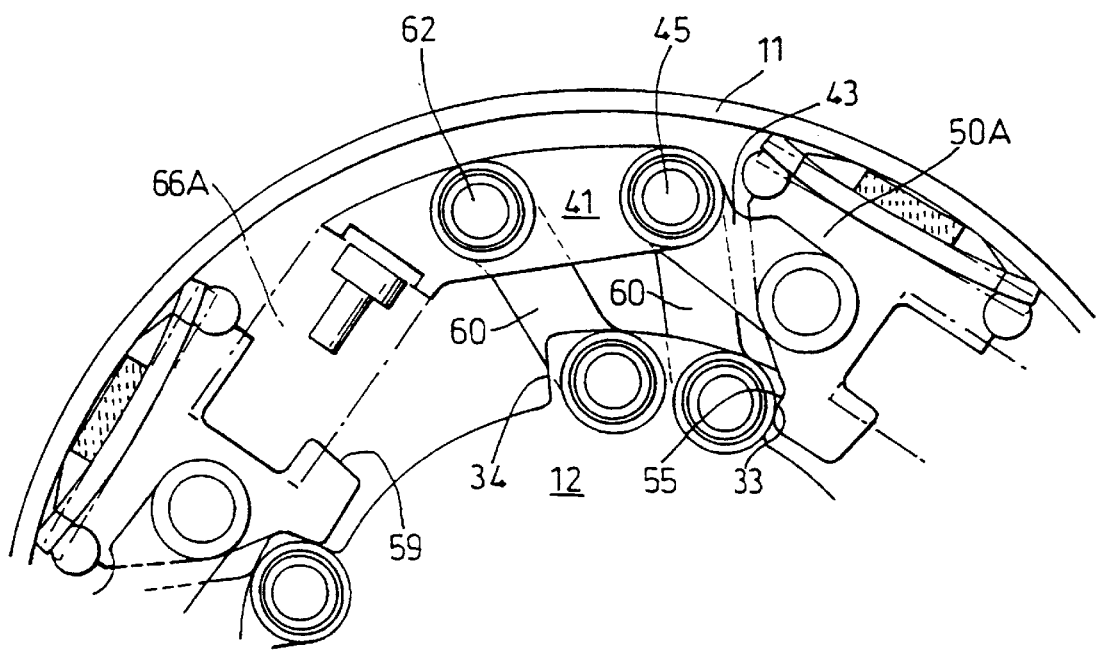
FIG. 5 is a partial axial cutaway view taken in the direction of arrow A of FIG. 2 with the damping device shown in a full over-run condition.
Figure 6:
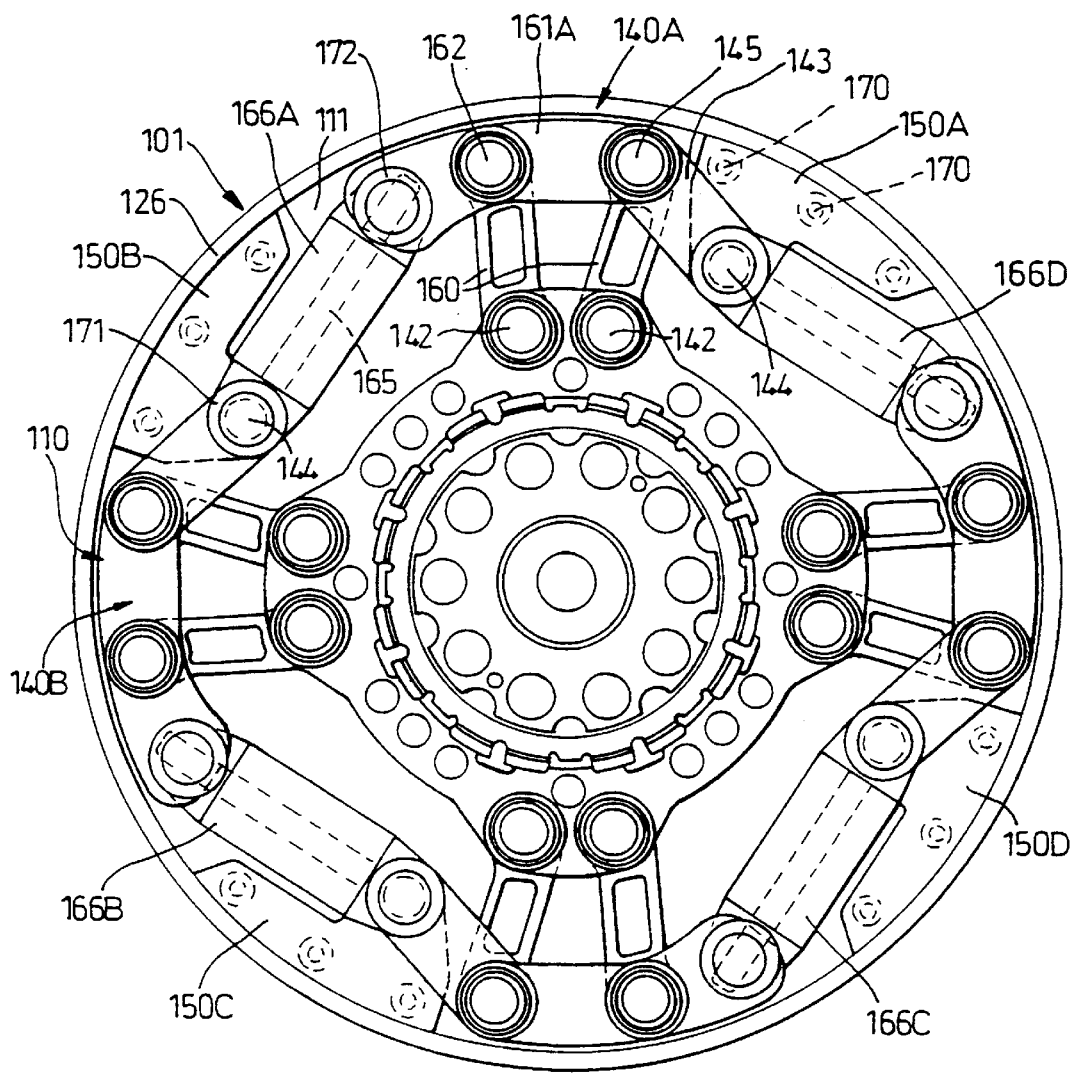
FIG. 6 is a view similar to FIG. 1 of a second embodiment of a damping device according to the present invention.
Figure 7:
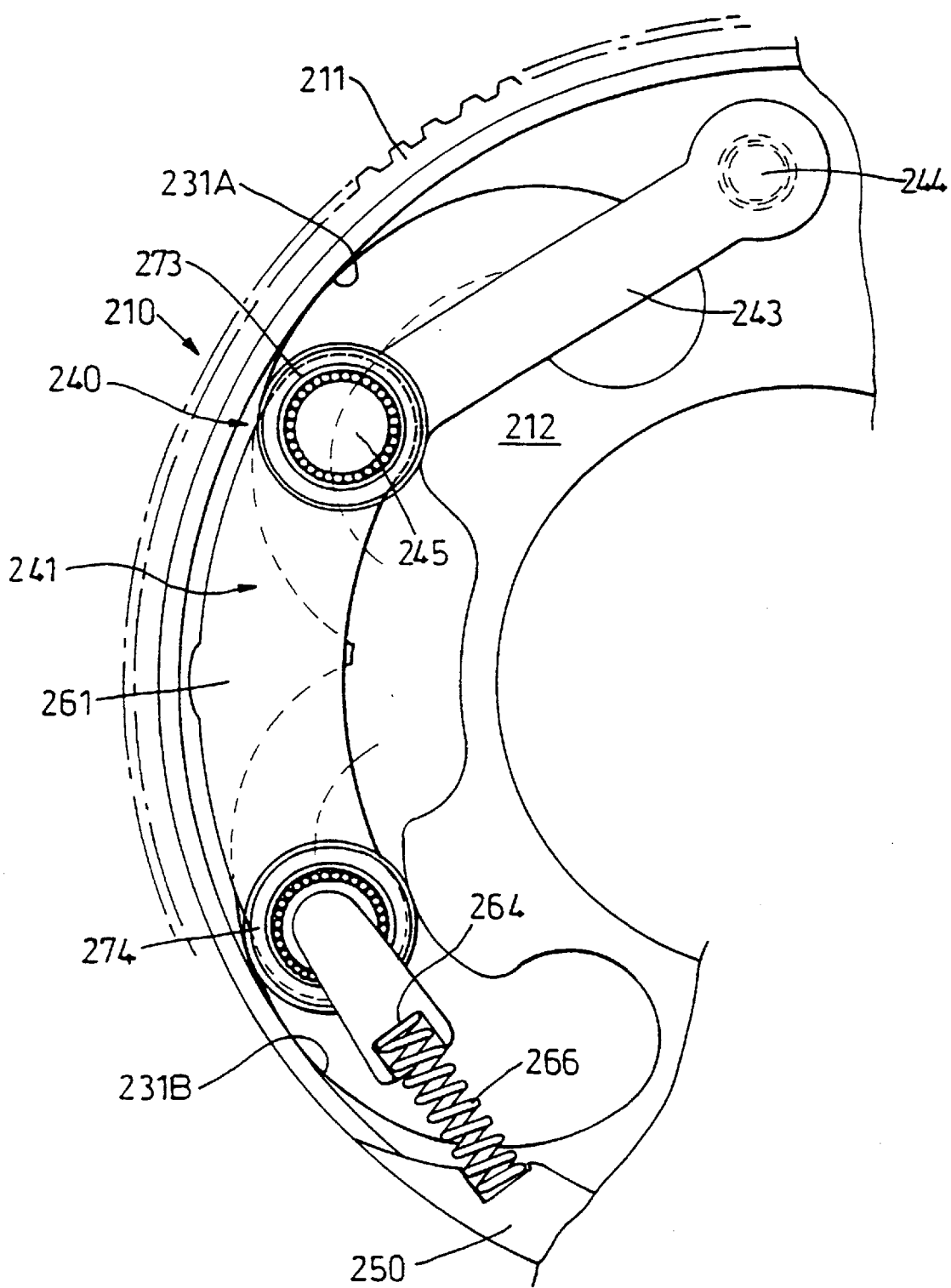
FIG. 7 is an axial view of a third embodiment of a damping device according to the present invention.

Abutment member 50A is in the form of a U-shape having two limbs 51 joined by a bridging portion 52 (see FIG. 3).

A resilient means in the form of a spring arrangement 66D is partially mounted between the limbs 51A, 51B and is supported by regions 53 of the limbs 51. Ends 54 (remote from bridging portion 52) of limbs 51 include stop portions 55.

It will be noted that bridging portion 52 is mounted circumferentially between rivets 22 and 23, with cut-outs 56 of limbs 51 acting against corresponding rivets 22 and 23. Thus, the rivets 22, 23 substantially prevent rotation of abutment 50a about the axis 15 of the damping device 10.

Abutment member 50A is mounted on the first part via leaf spring 57 since each end portion of leaf spring 57 abuts a respective rivet 22, 23 and a mid portion of the leaf spring 57 holds the bridging portion 52 against the inner surface of rim 26. In this case leaf spring 57 is installed in a stressed condition though in further embodiments this need not be the case. This arrangement of mounting the abutment member 50A on the input plate can under certain conditions allow the abutment member 50A to rotate about either pin 22 or pin 23. Thus, the abutment member 50A is resiliently mounted via the leaf spring 57 onto the first part.

Although the present embodiment discloses resilient mounting of the abutment member 50A via a leaf spring 57, any suitable form of resilient mounting could be used. For example, the bridging portion 52 could be bonded to an elastomer pad which in turn could be bonded to the inner surface of rim 26.

Spring arrangement 66A is mounted between the linkage device 40A (and in particular the connecting linkage 61) and the second part 12 (via abutment member 50B).

Figure 1B:
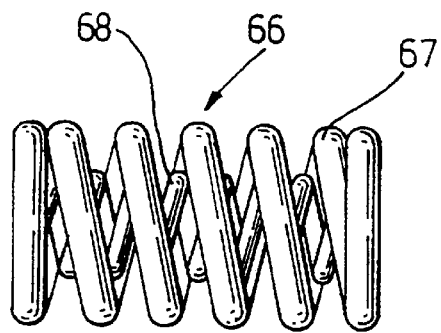
FIG. 1B is a view of a spring arrangement of FIG. 1.
Figure 2:
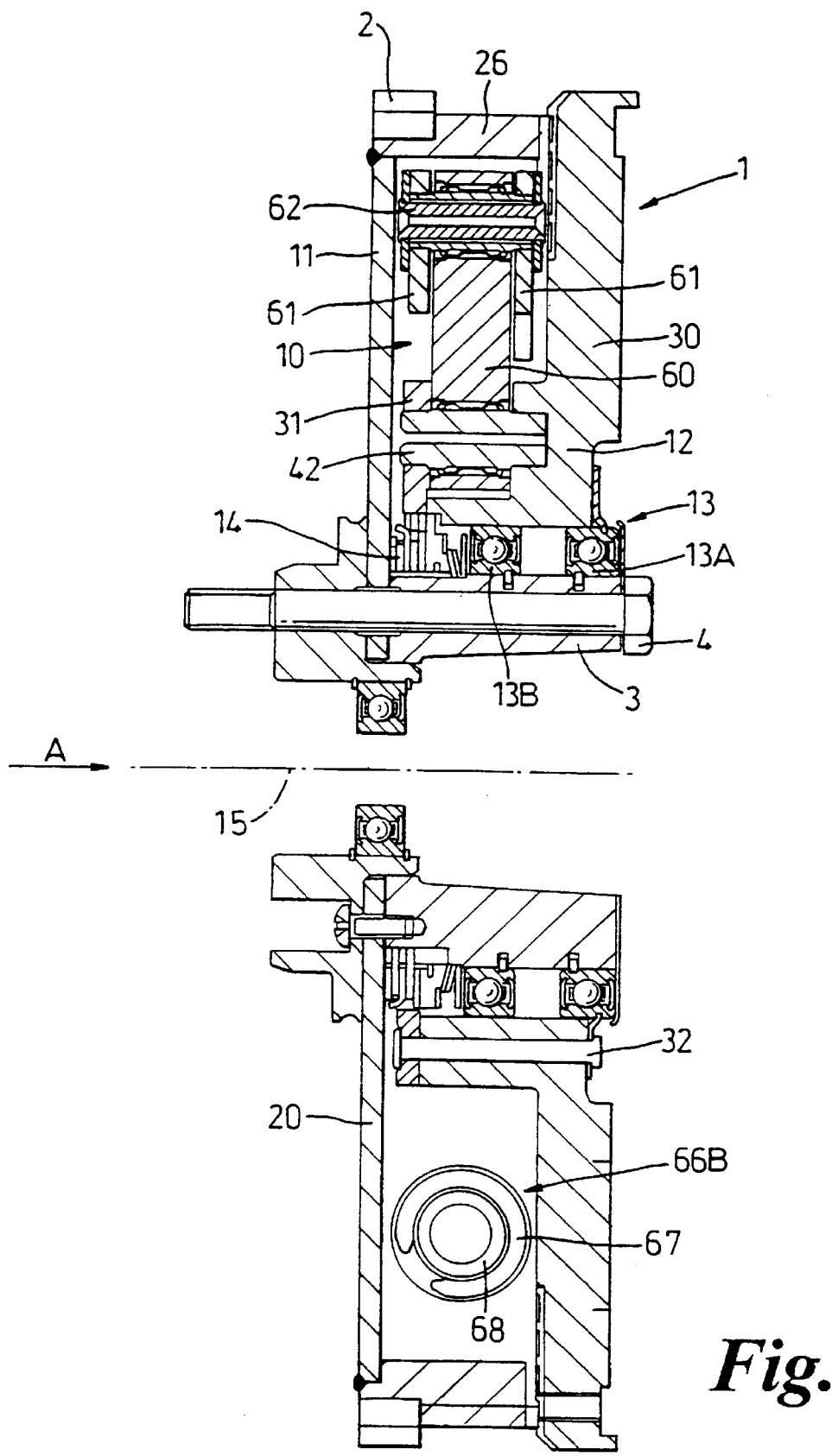
FIG. 2 is a radial view taken along the line BB of FIG. 1.

Spring arrangement 66A (shown diagrammatically in FIG. 1 but fully in FIG. 1B) consists of an outer spring 67 mounted concentrically relative to an inner spring 68 (see FIG. 1B). In this example both springs 67 and 68 are pre-tensioned when the damping device is in the neutral position but in further embodiments one or both springs need not be pre-tensioned. Spring arrangements 66B, 66C, and 66D are all identical to spring arrangement 66A. All spring arrangements are positioned in the damping device substantially tangentially with regard to the axis 15 of the damping device so as to act generally circumferentially of the damping device.

The damping device 10 is installed in twin mass flywheel 1 which includes the additional

What is claimed is:

1. A damping device including co-axially arranged first and second parts which can rotate relative to each other by a limited amount about an axis of the damping device, the damping device also including at least one linkage device comprising an anchor link pivotally connected via a first pivot to the first part and a linkage arrangement connected with the anchor link by a second pivot and having a torque transmitting connection with the second part, the linkage device acting to resist relative rotation of the first and second parts and a resilient means acting generally circumferentially on the linkage device and on the first part to resist all relative rotation of the first and second parts.

2. A damping device as defined in claim 1 in which the torque transmitting connection is in the form of a sliding or rolling connection acting on a track.

3. A damping device as defined in claim 1 in which the linkage arrangement comprises a second link pivotally connected to the second part.

4. A damping device as defined in claim 1 in which the linkage arrangement comprises a plurality of circumferentially spaced main links pivotally connected to the second part with circumferentially adjacent main links being interconnected by a generally circumferentially orientated connecting linkage.

5. A damping device as defined in claim 1 in which when the damping device is in a neutral position the first pivot is at a smaller radial distance from the axis than the second pivot.

6. A damping device as defined in claim 1 in which the resilient means acts between the linkage arrangement and the first part.

7. A damping device as defined in claim 1 in which the resilient means is a coil spring arrangement.

8. A damping device as defined in claim 1 in which the coil spring arrangement comprises two concentrically arranged coil springs.

9. A damping device as defined in claim 8 in which one of the coil springs operates before the other of the coil springs.

10. A damping device as defined in claim 9 in which the spring arrangement is guided by a central rod mounted on the first part or linkage device or end support.

11. A damping device as defined in claim 10 in which both ends of the spring arrangement react against corresponding end supports and the rod is guided by one of the end supports.

12. A damping device as defined in claim 7 in which at least one end of the spring arrangement reacts against an end support, said end support being pivotally mounted on the linkage device or first part.

13. A damping device as defined in claim 7 in which the spring arrangement is guided by a support member mounted on the linkage arrangement or first part.

14. A damping device as defined in claim 1 in which the first pivot is resiliently mounted on the first part.

15. A damping device as defined in claim 1 in which a first stop on the second part contacts a second stop associated with the first pivot to limit rotation of the second part relative to the first part.

16. A damping device as defined in claim 1 in which a third stop on the second part contacts a fourth stop on an abutment member on the first part against which the resilient means acts.

17. A damping device as defined in claim 16 in which the abutment member is resiliently mounted on the first part by a leaf spring.

18. A damping device as defined in claim 17 in which the anchor link is pivotally mounted between the limbs and in which each end portion of the leaf spring reacts against a respective rivet and a mid portion of the leaf spring reacts against the bridge portion to resiliently mount the abutment member.

19. A damping device as defined in claim 17 in which the leaf spring is pre-stressed.

20. A damping device as defined in claim 19 in which a third stop of the second part contacts a fourth stop abutment member on the first part against which the resilient means acts and in which the leaf spring pre-stress is such that the resilient mounting of the abutment member only operates as a result of contact between the first and second stops or the third and fourth stops.

21. A damping device as defined in claim 15 in which the abutment member is of a U-shaped form having two limbs joined by a bridging portion.

22. A damping device as defined in claim 21 in which the anchor link is pivotally mounted between the limbs.

23. A damping device as defined in claim 21 in which the resilient means is at least partially mounted between the limbs.

24. A damping device as defined in claim 21 in which ends of the limbs remote from the bridge portion act as the second and fourth stops.

25. A damping device as defined in claim 21 in which the bridge portion is mounted between two rivets secured rotationally fast with the first part.

26. A damping device as defined in claim 25 in which the rivets substantially prevent rotation of the abutment member about the axis of the damping device.

27. A damping device as defined in claim 25 in which the rivets allow rotation of the abutment member about an axis of at least one of the rivets.

28. A damping device as defined in claim 1 in which the damping device includes a plurality of linkage devices and the first pivot of one linkage device is mounted on an abutment member engaged by the resilient means of another linkage device.

29. A damping device as defined in claim 1 in which the resilient means is mounted substantially tangentially with regard to the axis of the damping device.

30. A damping device as defined in claim 1 in which the resilient means acts to resist relative rotation of the first part relative to the second part in both a first direction of relative rotation and a second direction of relative rotation.

31. A damping device as defined in claim 1 in which the, first pivot is mounted on a support member which is resiliently mounted on the first part.

32. A damping device as defined in claim 1 in which the support member is of a U-shaped form having two limbs joined by a bridging portion.

33. A damping device as defined in claim 32 in which the anchor link is pivotally mounted between the limbs.

34. A damping device as defined in claims 32 in which the bridge portion is mounted between two rivets secured rotationally fast with the first part.

35. A damping device as defined in claim 34 in which the rivets substantially prevent rotation of the support member about the axis of the damping device.

36. A damping device as defined in claims 34 in which the rivets allow rotation of the support member about an axis of at least one of the rivets.

37. A damping device as defined in claim 31 in which the support member is resiliently mounted on the first part by a leaf spring.

38. A damping device as defined in claim 37 in which each end portion of the leaf spring reacts against a respective rivet and a mid portion of the leaf spring reacts against the bridge portion to resiliently mount the support member.

39. A damping device as defined in claims 37 in which the leaf spring is pre-stressed.

40. A damping device as defined in claim 1 in which a first stop on the second part contacts a second stop on the first part to limit rotation of the second part relative to the first part in a first direction.

41. A damping device as defined in claim 40 in which a third stop on the second part contacts a fourth stop on the first part to limit rotation of the second part relative to first part in a second direction opposite to the first direction.

42. A damping device as defined in claim 41 in which the first pivot is mounted on a support member which is resiliently mounted on the first part and in which at least one of the second and fourth stops are provided on the support member.

43. A damping device as defined in claim 40 in which the support member is of a U-shaped form having two limbs joined by a bridging portion and in which ends of the limbs remote from the bridge portion act as the second and fourth stops.

44. A damping device as defined claim 42 in which the leaf spring is pre-stressed and in which the leaf spring pre-stress is such that-the resilient mounting of the support member only operates as a result of contact-between the first and second stops.

45. A damping device as defined claim 42 in which the leaf spring is pre-stressed and in which the leaf spring pre-stress is such that the resilient mounting of the support member only operates as a result of contact between the third and fourth stops.

46. A damping device as claimed in claim 1 including stops being provided on the first and second parts respectively which come into contact to substantially limit the relative rotation of the two parts, in which at least one of the stops is resiliently mounted to its respective part so as to permit a further limited amount of relative rotation of the two parts following contact between the stops.

47. A damping device as claim 46 in claim in which the stops are both made of metal.

48. A damping device as claimed in claim 46 in which the at least one stop is provided on a support member which is resiliently mounted to the respective part.

49. A damping device according to claim 1 in the form of a twin mass flywheel in which the first and second parts comprise input and output masses of the flywheel which are supported for relative axial rotation on two axially spaced bearings.

50. A damping device as defined in claim 42 in which the resilient means is resiliently mounted on the first part.

* * * * *